April 20, 1954 F. GERARDINE 2,675,976
COMPOSITE VEHICLE
Filed Jan. 16, 1946 5 Sheets-Sheet 1
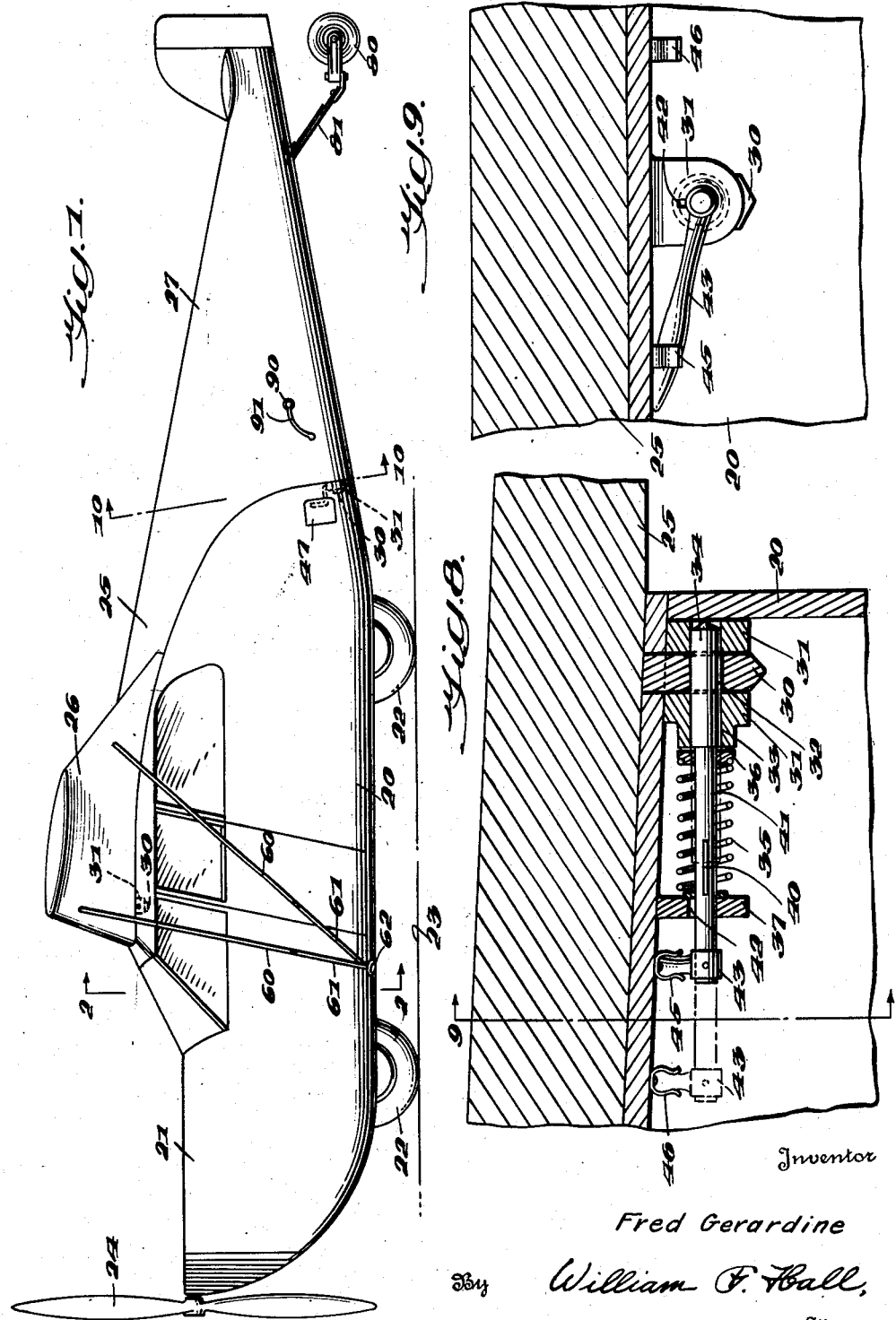
Inventor
Fred Gerardine
By William F. Hall,
Attorney

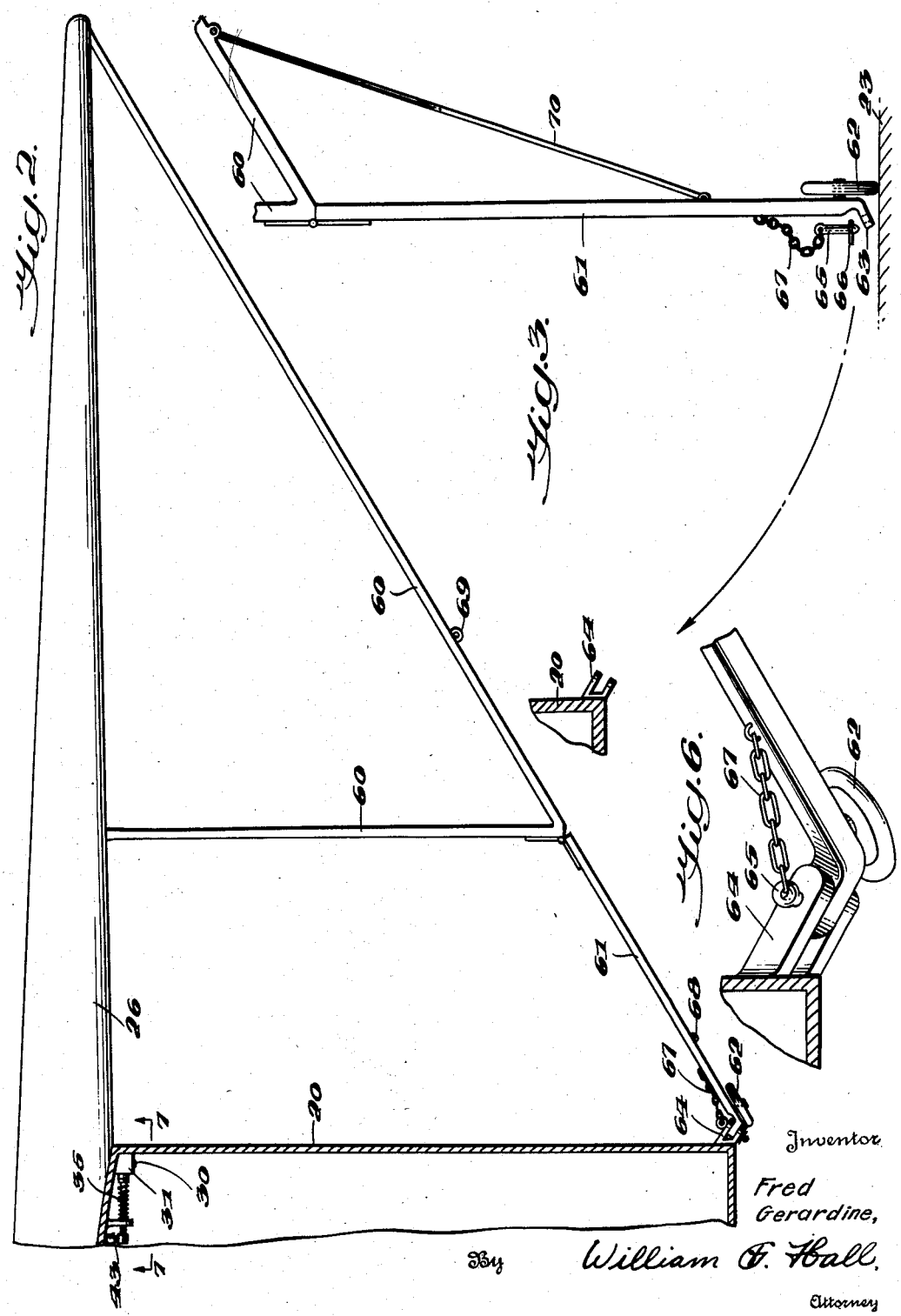

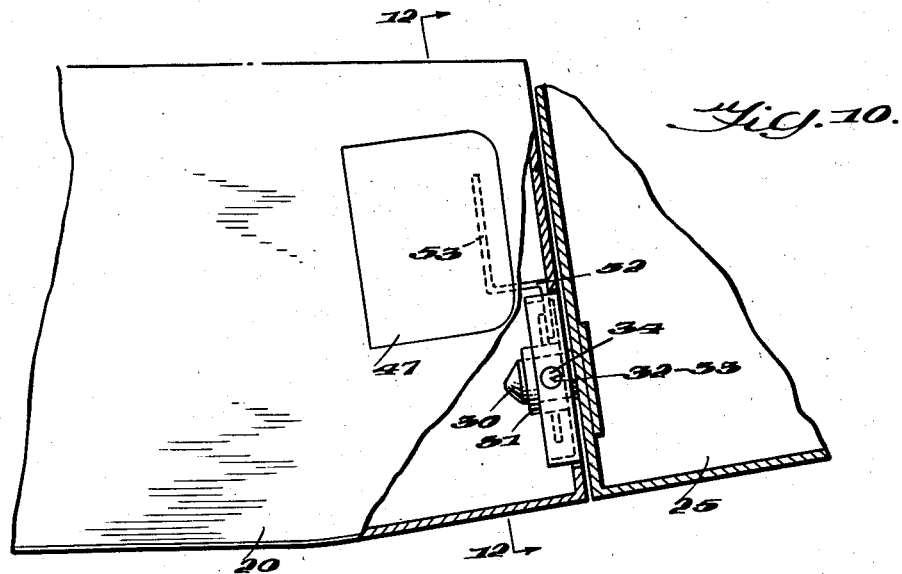
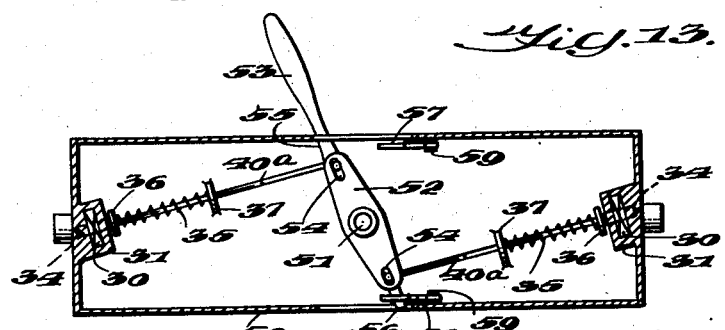
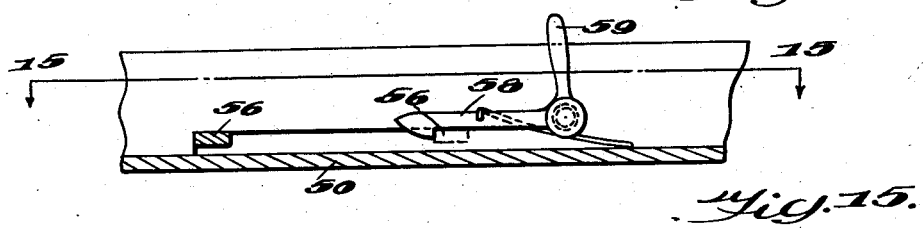
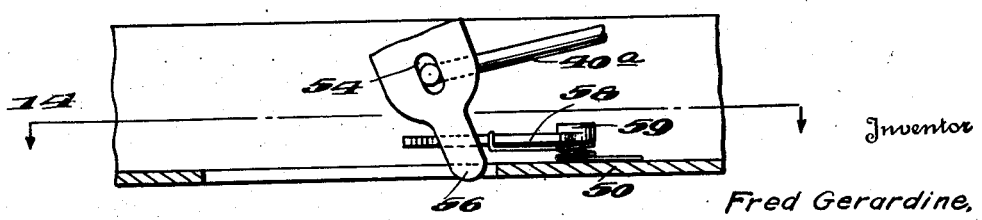

April 20, 1954 F. GERARDINE 2,675,976
COMPOSITE VEHICLE
Filed Jan. 16, 1946 5 Sheets-Sheet 4

Inventor
Fred Gerardine,
By William F. Hall,
Attorney

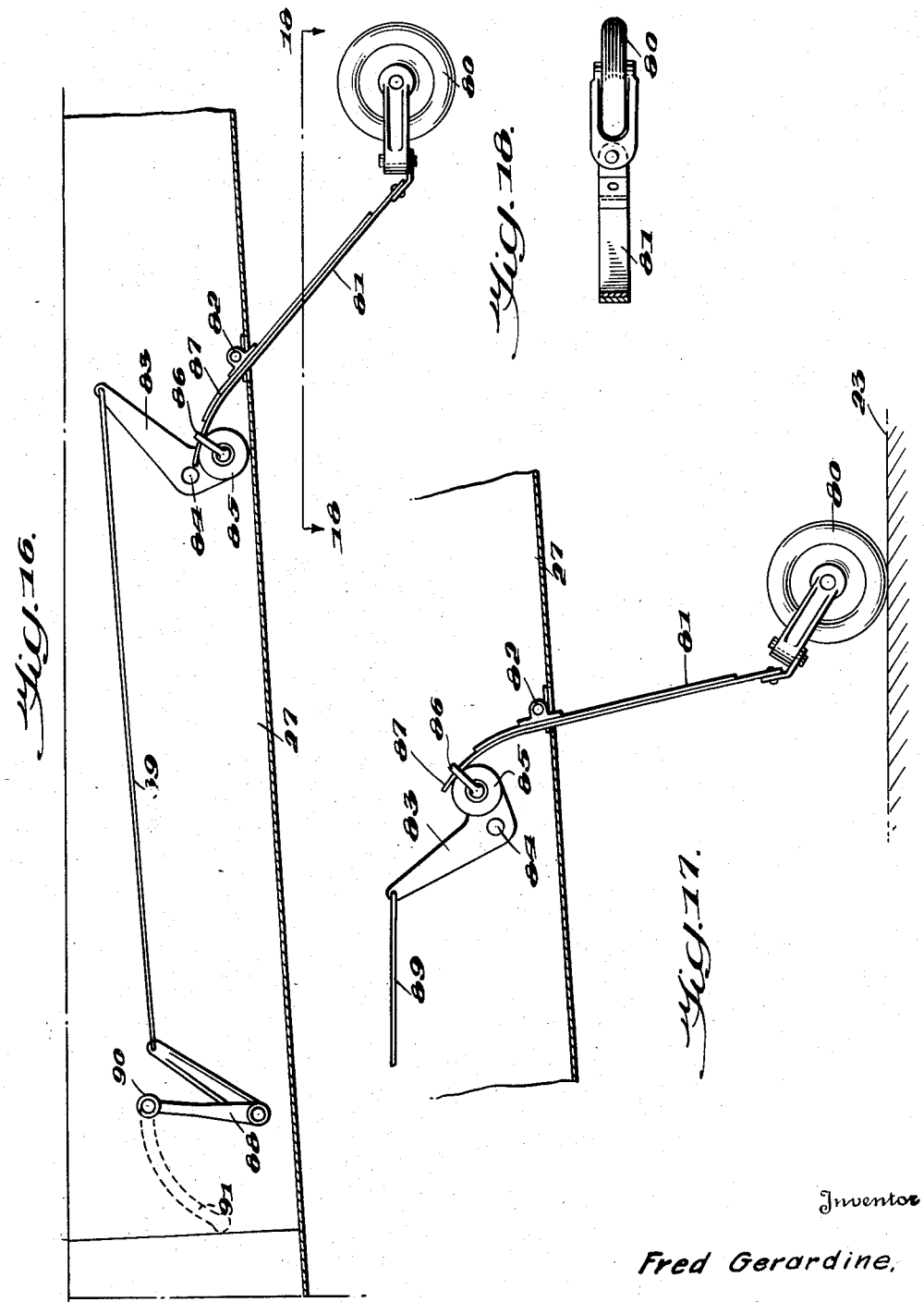

Patented Apr. 20, 1954

2,675,976

UNITED STATES PATENT OFFICE 2,675,976

COMPOSITE VEHICLE

Fred Gerardine, Bradford, Pa.

Application January 16, 1946, Serial No. 641,488

3 Claims. (Cl. 244—2)

1

This invention relates to composite vehicles and the like and aims generally to improve the same. In particular, the invention is applicable to facilitate the removal of aircraft sub-assemblies, as the tail and wing sub-assembly of an aircraft, to adapt the main body portion of the craft for travel as a road vehicle, for example.

Important objects of the invention, severally and interdependently, are to provide improved means for supporting a detachable sub-assembly of such a vehicle; to provide improved wing supporting elements cooperable as wing attaching means; to improve the pilot wheel support to adapt it to cooperate with the other supporting structure; to provide improved strut means for supporting a detachable wing assembly; and to otherwise improve the ease and security of attachment of a flight sub-assembly to a body portion of such craft. Other objects and advantages, and special features contributing to the realization of objects of the invention, will be apparent from the following detailed description of a preferred embodiment illustrative of its principles.

In the accompanying drawings illustrative of such embodiment:

Fig. 1 is a side view of a composite road and air vehicle according to my invention;

Fig. 2 is an enlarged partial section taken on line 2—2 of Fig. 1, Fig. 3 being a similar view, further enlarged, with the parts in another position;

Figure 11:
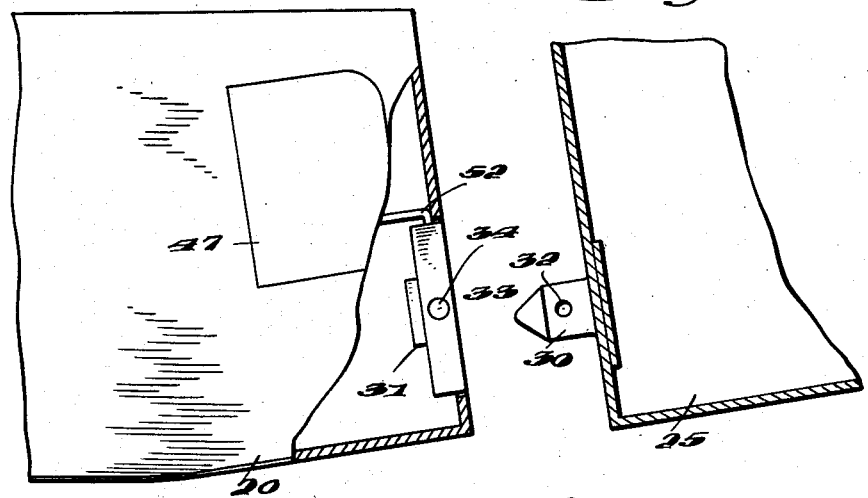
Figure 12:
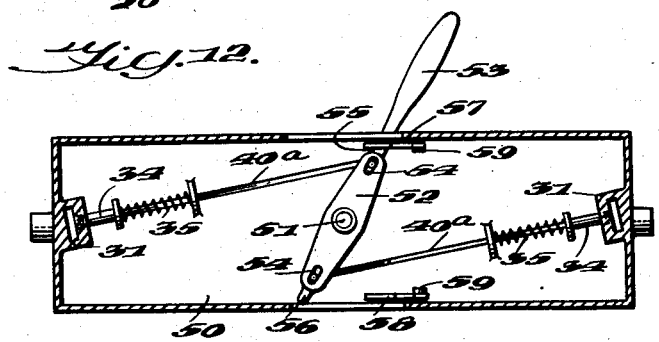
Figures 4, 5, 7:
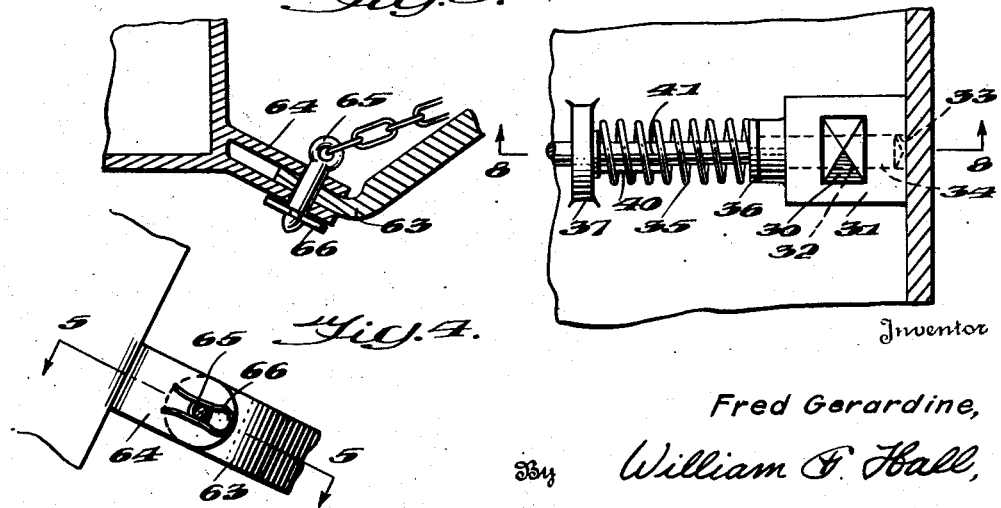

Figs. 4 and 5 are detail bottom-plan and sectional views of a part of the strut connection of Figs. 2 and 3, taken respectively at lines 4—4 of Fig. 2 and 5—5 of Fig. 4, Fig. 6 being a perspective detail thereof;

Figs. 7, 8 and 9 are detail bottom-plan, section and end views of part of the sub-assembly attaching means, taken respectively on lines 7—7 of Fig. 2, 8—8 of Fig. 7, and 9—9 of Fig. 8;

Figs. 10 to 15 are details of another part of the sub-assembly attaching means, Figs. 10 and 11 being partial sections showing the connection at line 10—10 of Fig. 1, Figs. 12 and 13 being sections taken at line 12—12 of Fig. 10 showing the parts in two relative positions of adjustment, and Figs. 14 and 15 being enlarged partial sections taken on the same line;

Figs. 16 and 17 are partial longitudinal sections showing the controls for the sub-assembly pilot wheel of Fig. 1, Fig. 18 being a partial plan taken on line 18—18 of Fig. 16.

In the illustrative embodiment shown in Fig. 1 my composite vehicle comprises a main body portion 20 constructed for travel as a road vehicle

2 or as a part of a composite air-craft structure. To this end the main body portion 20 may be provided with an engine housing 21, a suitable number of wheels 22 adapted to rest on a road surface 23, a propeller 24 of suitable design, and its passenger space and roof contour may resemble a standard type automobile, preferably one of the streamlined sedan type. The main body portion also preferably comprises suitable clutching devices for connecting and disconnecting the propeller 24 with the power plant used in flight and for clutching and de-clutching the wheels 22 with the power plant used in service as a road vehicle, as well as other controls normally employed in road vehicles and in aircraft of the type concerned.

Detachably secured to the main body portion 20 to convert it for use as an air vehicle, is a flight sub-assembly structure 25, which may comprise in one unit the wing sub-assembly 26 and a fuselage sub-assembly shown as the tail sub-assembly 27. In the form shown the sub-assembly structure 25 is shaped to fit snugly over the roof and rear-deck structure of the main body portion 20, and is secured thereto to form a complete fuselage therewith, preferably by securing means of my invention shown in Figs. 2 through 15. As will be understood by those skilled in the art the sub-assembly means 25—27 is so designed as to place the wing and other flight sustaining surfaces in proper aero-dynamic balance to the structure as a whole, and suitable controls (not shown) are included to provide for manipulation of the aileron-, rudder-, elevator- and other flight-control elements of the type of aircraft concerned, which controls include suitable means to connect them for operation from the passenger space of the vehicle, as detachable electrical, mechanical or fluid pressure connections.

In the form shown in Figs. 1, 2 and 7–13, the assembly securing means consists of a plurality of cooperating lug and slot members 30—31 associated, the one with the main body 20, and the other with the sub-assembly 25. These cooperating lug and slot members are preferably located so that some of them lie adjacent the parts of the wing sub-assembly 26 at either side of the main body section, as shown in Figs. 1 and 2, while others lie at points of connection remote therefrom, viz. at the rear end of the main body 20 in the form shown. To provide for securing these lug and slot connections in assembled relation, each cooperating pair 30—31 is provided with cooperating bolt-holes 32—33 (Figs. 7–11)

to receive bolt members 34. In the preferred form these bolt members 34 are spring-pressed toward engaging position by the coil springs 35 (Figs. 7, 8, 12 and 13) engaged between abutments 36 and 37 associated with each bolt member. Each of the bolt members is further provided with two-position positive engagement means serving in one position thereof to hold the bolt member retracted against the spring action of spring 35, and serving in its other position to positively prevent retraction of the bolt member, as a safety feature supplementing the action of the springs 35.

In the embodiment shown in Figs. 7–9 (see also Figs. 1 and 2) the positive engagement means comprises a key 40 carried by the bolt operating stem 41, and a slot 42 formed in a member through which said stem passes, herein the abutment member 37. In this form the bolt operating stem 41 is provided at its projecting end with a transverse handle member 43 by which the stem may be turned to align or misalign the key 40 and slots 42, and by which the bolt may be retracted against the action of spring 35 or advanced with such action, when the parts are so aligned.

With this arrangement, to lock the bolt member in engaging position it is merely necessary to place the handle 43 in the position shown in Figs. 8 and 9, where it may be held by suitable retainer means, as the spring clip 45. To retract the bolt member against the action of spring 35, it is but necessary to turn the handle downwardly to vertical position to align key 40 and slot 42 and then move it to the position shown in dotted lines in Fig. 8, thus moving the key 40 completely through slot 42; and to hold the bolt retracted against the action of spring 35 it is then only necessary to again turn the handle 43 to a horizontal position, where it may be held by suitable retainer means, as spring clip 46.

In the form shown in Figs. 1 and 2 bolt operating and locking means of the type shown in Figs. 7–9 are employed at each side of the top forward portion of the wing subassembly 26, where it joins the roof structure of the passenger space of main body 20, since the handles 43 are readily accessible from the passenger space in this position.

In places where this type of bolt operating means would not be readily accessible, or where it is desired to operate a plurality of bolt members 34 by common operating means, as at the rear deck connection in Fig. 1, I preferably employ the form of operating and positive engagement means shown in Figs. 10–15, located within the stream-lined body of the vehicle, which is provided with access means as door 47 (Figs. 1, 10 and 11) through which the operating mechanism may be reached.

In this form of bolt arrangement, I preferably provide a housing 50 embracing a plurality of spring-pressed bolts and stems 34—37, which housing is provided with a pivot 51 carrying a swinging operator 52, terminating in a handle 53 disposed exteriorly of the housing. Operator 52 is provided with lost-motion connections in the form of slots 54 which engage the turned up ends of bolt stems 40a, and with abutment means 55 and 56 for engaging respectively with spring pressed hook members 57 and 58 to positively hold the bolt members 34 retracted against the action of springs 35, or in their engaging position. The spring pressed hooks or dogs 57 and 58 may be pivoted to housing 50 as shown and are each provided with a handle 59 (best shown in Fig. 14) by which they may be raised from engagement with the associated abutments of the operator 52. With this arrangement, to move the two-position positive engagement means from retracted position (Fig. 12) to bolt advancing positions (Fig. 13) it is only necessary to raise dog 57 and move handle 53 to the position shown in Fig. 13, whereupon abutment 56 engages under dog 58 positively locking the parts in their new position.

Important features of the invention, shown in Figs. 2 to 6, and 16 to 18, reside in the provision of double-function means employed, when the sub-assembly is detached, to support it for transportation and storage, and employed, when the sub-assembly is mounted on the main body, as strut means for bracing and supporting the wing structure, and as a pilot wheel, or tail skid, for the composite craft in take off and landing.

Referring to Figs. 2 to 6, the wing 26, overlying the body portion 20, and detachable therefrom in the form shown, is provided with strut means 60 at either side of the body portion 20, including swingable members 61, having wheels or the like 62 at their lower ends adapted to contact the ground 23 (Figs. 1 and 3) when the swingable members 61 are moved to vertical positions (Fig. 3), and to be held clear of the ground 23 when the members 61 are swung inwardly to the position thereof shown in Figs. 1 and 2. These swingable members are also provided at their free ends with apertured lugs 63, positioned to clear the ground when wheels 62 rest upon it (Fig. 3) and adapted when the swingable members are moved inwardly to cooperatively engage apertured slot members 64 carried by body portion 20, and to be detachably secured thereto by pins 65 and pin retainers 66. Pins 65 preferably are suitably secured to the swingable members 61, as by chains 67, and lugs 68 and 69 are carried by the swingable and stationary strut members to receive tie-rods 70 (Fig. 3) which constitute means for holding the swingable members in their vertical positions.

As is best shown in Fig. 2, the stationary portions 60 of the strut means each comprise an inwardly and downwardly inclined tension and compression member (carrying lug 69) that aligns with the tension and compression member 61 when the latter is secured to the complete fuselage as shown, to support the outwardly extending or end portion of the wing under flying and landing loads; and in addition comprises the portion extending vertically from the hinged connection to element 61, that aligns with the member 61 in its downwardly swung position and thus affords efficient, light-weight support for the sub-assembly in straddling relation to the main body portion for assembly and dis-assembly therewith, and apart therefrom.

As will further be apparent from Figs. 2, 3 and 6, the engagement of the angled lugs 63 in the slot members 64 serves to transfer directly to the member 64 most of the tension or compression stress transmitted from the wing through the inclined members of struts 60, so that the pin means 65 do not have to carry such stress, and the pin retainers 66 are not subjected to any stress from the strut members that would tend to disengage them and present a dangerous condition.

Referring to Figs. 1 and 16 to 18, in my preferred embodiment, I mount the pilot wheel or tail-skid 80 on a movable resilient support, so that it may be raised and lowered relative to the fuselage sub-assembly 27 with which it is associated. In the form shown this is effected by swivelling the wheel 80 on a leaf-spring 81 pivoted intermediate its ends at 82, and the position of which is controlled by a suitable linkage, preferably comprising a bell crank lever 83 pivoted to the sub-assembly at 84 and having a roller 85 and clevis 86 between which the projecting end 87 of the leaf spring is engaged. Suitable means is provided to operate the bell-crank 83 from a convenient position, as one adjacent the control door 47, preferably by the provision of a second lever 88 (Fig. 16), coupled to the bell crank 83 by tie-rod 89, and having a telescoping handle 90 projecting through an arcuate slot 91 in the fuselage sub-assembly. The arcuate slot 91 is preferably provided with a cover (not shown) and terminates in enlarged end portions adapted to engagingly receive the telescoping handle 90 and retain it in position. When the handle 90, of larger diameter than the rod upon which it telescopes, is pulled outwardly, the rod may be moved from one end of the slot to the other and the handle telescoped to engage in the enlarged opening thereof to hold the parts adjusted. By this arrangement the pilot wheel or skid 80 may be raised to the position shown in Figs. 1 and 16, for flying, and may be lowered to engage the ground 23 (Fig. 17) to aid in supporting the sub-assembly during attachment and detachment.

By the above provisions the attachment, detachment, and storage of the sub-assembly is greatly facilitated. With the swingable struts 61 positioned as in Fig. 3, and the pilot member 80 as in Fig. 17, the sub-assembly may easily be rolled into place over the main body which is straddled by the strut members 60—61. Sufficient tolerance being provided to enable engagement of the several lug and slot members 30—31, the members 61 and 80 are then raised from contact with the ground, thus lowering the sub-assembly into position, and the several bolts 34 are advanced and locked in engagement. A simple reversal of the process enables the sub-assembly to be removed and rolled away for storage, adapting the main body for use as a road vehicle. The electrical, mechanical, and fluid pressure connection for control motors, air-brakes, de-icers and other conventional or special aircraft equipment are preferably arranged to be coupled and uncoupled from within the passage space or this may be effected through access panel 47, Fig. 1.

Obviously, the foregoing detailed description of a preferred embodiment of my invention is illustrative and not restrictive, and the invention is not limited to the particular embodiment disclosed.

I claim as my invention:

1. A composite road and air vehicle of the type comprising a wheeled main body portion, a wing and fuselage sub-assembly detachable therefrom, means for securing the fuselage portion of the sub-assembly to said main body portion to form a complete fuselage therewith, and means for supporting the wing loads of said sub-assembly comprising tension and compression strut members movably secured to the wings of said sub-assembly in outwardly spaced relation to the fuselage portion thereof, said strut members being of such length and so placed that in one position thereof they extend downwardly to a plane as low as the bottoms of the wheels of said main body portion and support the wing and thereby the sub-assembly in straddling relation to said body portion, and in a second position thereof they extend inwardly to said main body portion in upwardly spaced relation to said plane, and means for securing said strut members to said body portion in said second position to brace the outwardly extending portions of the wing against flying and landing loads, in which the movable strut members are swingably attached to the sub-assembly and have their free ends detachably secured to the complete fuselage, the means for securing the strut members to the fuselage comprising lug and clevis means, the lug means entering into the clevis means and extending at an angle of between 45 and 90° to the axis of the swingable strut members, and the lug and clevis means being provided with aligned apertures therethrough at about right angles to the plane of the lug and with pin means for passing through said aligned apertures, whereby such pin means are relieved of tension and compression loads transmitted through said swingable strut members.

2. A combination according to claim 1, further provided with releasable means for retaining said pin means in position in said aligned apertures.

3. In a composite road and air vehicle, in combination, a wheeled main body portion, a wing and fuselage sub-assembly detachable therefrom, means for securing the fuselage portion of said sub-assembly to said wheeled main body portion to form therewith a complete fuselage, the wing portion of said sub-assembly comprising wing and supporting strut means depending therefrom and including inclined tension and compression strut members extending from the wing ends downwardly and inwardly to the lower part of said complete fuselage and detachably secured thereto and bracing the wing therefrom, the portions of said tension and compression strut members proximate to the fuselage being hinged to the portions thereof remote therefrom to swing relative thereto to a position in which they extend downwardly to a plane as low as the bottoms of the wheels of said main body portion, the stationary inclined portion of the tension and compression strut means being vertically braced to the wing portions of said sub-assembly adjacent the hinged connections, whereby the hinged portions of the tension and compression strut means when secured to the complete fuselage contribute to the support of the wing ends under flying and landing loads, and when swung downwardly, form extensions of the vertical bracing for supporting said sub-assembly in straddling relation to said body portion and for movement apart therefrom.

References Cited in the file of this patent

UNITED STATES PATENTS

| Number | Name | Date |
|---|---|---|
| 509,941 | Perry | Dec. 5, 1893 |
| 1,400,483 | Fehr | Dec. 13, 1921 |
| 2,215,003 | Johnson | Sept. 17, 1940 |
| 2,241,577 | Beals | May 13, 1941 |
| 2,294,850 | Ostrander | Sept. 1, 1942 |
| 2,373,467 | Frakes | Apr. 10, 1945 |
| 2,624,530 | Hanssen | Jan. 6, 1953 |

FOREIGN PATENTS

| Number | Country | Date |
|---|---|---|
| 539,625 | Great Britain | Sept. 18, 1941 |